No. 644,911. Patented Mar. 6, 1900.
F. W. HEDGELAND.
ARTIFICIAL BAIT.
(Application filed Nov. 15, 1899.)

(No Model.)

Witnesses:
Chas. E. Gaylord,
L. M. Freeman.

Inventor,
F. W. Hedgeland
By L. B. Coupland & Co.
Att'ys

THE NORRIS PETERS CO., PHOTO-LITHO., WASHINGTON, D. C.

United States Patent Office.

FREDERICK W. HEDGELAND, OF CHICAGO, ILLINOIS.

ARTIFICIAL BAIT.

SPECIFICATION forming part of Letters Patent No. 644,911, dated March 6, 1900.

Application filed November 15, 1899. Serial No. 737,072. (No model.)

*To all whom it may concern:*

Be it known that I, FREDERICK W. HEDGELAND, a citizen of the United States, residing at Chicago, in the county of Cook and State of Illinois, have invented certain new and useful Improvements in Artificial Bait; and I do hereby declare the following to be a full, clear, and exact description of the invention, such as will enable others skilled in the art to which it appertains to make and use the same.

This invention relates to artificial bait used in angling for fish, and has for one of its objects to provide a device of this kind that will embody great attractive qualities and show a large reflecting-surface as it is propelled through the water.

Another object is to provide a bait that is adapted for either casting, trolling, or still-fishing and at the same time simplify the fishing outfit, as usually but two or three sizes of the bait are required in catching different species of fish, thereby dispensing with numerous tackle and parts ordinarily comprising part of a fisherman's outfit.

Another object is to provide an artificial bait in which the hooks are less liable to become entangled in the weeds or to catch in other obstructions, thus saving much time and annoyance and greatly increasing the chances of success.

With this form of bait the chances for successfully hooking the fish are greatly improved, and at the same time the liability of the hook being swallowed is greatly lessened.

Figure 1:
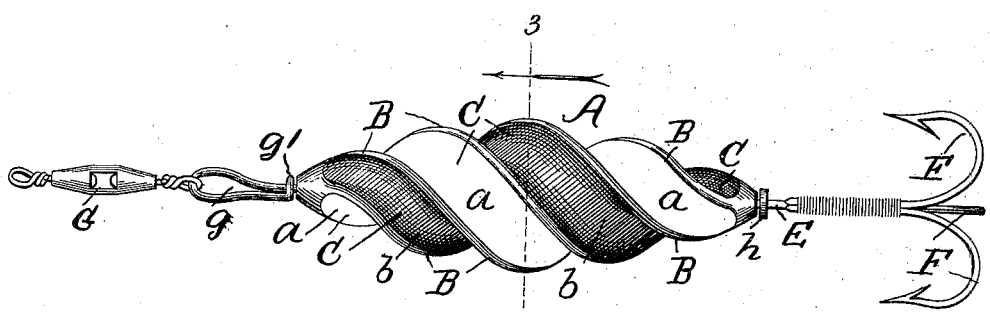
Figure 2:
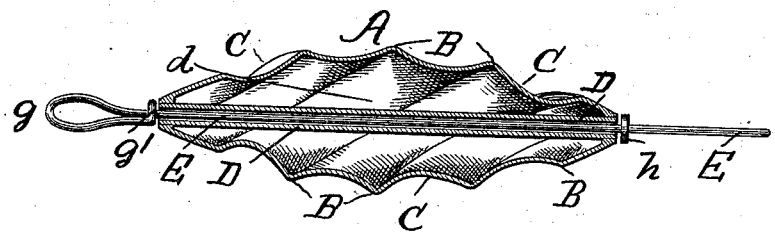
Figure 3:
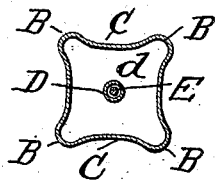

In the accompanying drawings, Figure 1 is an elevation of a device embodying the improved features. Fig. 2 is a longitudinal section, the hook being omitted; and Fig. 3 is a transverse section on line 3, Fig. 1, looking in the direction indicated by the arrow.

A represents the artificial bait, which consists of a hollow spiral body made from light sheet metal. This body gradually grows less in diameter from its longitudinal center in the direction of its respective ends, the exterior surface being made up of a number of continuous spiral ribs or blades B and the corresponding intermediate spiral grooves or channels C, which have their greatest depth at the center and gradually grow less in the direction of and vanish at the ends. The grooves will present alternating colors, the groove $a$ being of a white or silvery shade, such as a nickeled surface would present, and the next groove $b$ of a dark shade or color, and so on alternately. As the bait is propelled through the water the spiral ribs will impart a rapid rotary motion to the body, so that the surface will present the effect of a quickly appearing and disappearing flash or streak of silvery white, which has the effect of greatly heightening the attractive feature of alluring the fish to spring at the singularly-appearing object.

A tube D is open at both ends and is inserted longitudinally through the chamber $d$ of the body A and stops flush with the respective ends thereof, as shown in Fig. 2. The respective ends of this tube are rigidly secured to the adjacent surface of the body A and shuts out the water from gaining admission to the chamber $d$. If water were admitted to the chamber, the buoyancy of the body would be lessened and its rapid movement in the water somewhat retarded. This tube, in connection with the wire rod E, forms the axis and bearing for the rotary movement of the body A. The wire rod is inserted loosely through the axial tube D, one end projecting for the reception of the fish-hooks F, which may be secured thereto in any suitable manner. The opposite projecting end is bent around upon itself to form the loop $g$, and the stop-shoulder $g'$ limits the endwise movement of the rod E in one direction, the collar $h$ limiting the movement in the opposite direction. This provides for a free rotary movement of the body A and retains the parts in their proper relative position.

The swivel attachment G provides for the usual line connection.

When being drawn through the water, the spiral body moving in advance has the effect of spreading the weeds apart and removing other obstructions from the path of the hooks, so that the liability of the hooks being caught is reduced to a minimum. The bouyancy of the hollow body is such that it is just barely submerged for shallow-water or near-shore fishing. For deep-water fishing the line would have to be provided with a "sinker."

When a fish seizes the bait, the spiral formation and twist movement have the effect of quickly impaling it on the hooks.

Having thus described my invention, what I claim as new, and desire to secure by Letters Patent, is—

1. An artificial bait, comprising a body provided with spiral blades and alternating grooves throughout its surface and adapted to have a rotary motion in its passage through the water, substantially as described.

2. An artificial bait, comprising a hollow body, having its greatest diameter at its longitudinal center and from thence tapering in the direction of each end and having its surface composed of alternating spiral ribs and spiral grooves, substantially as described.

3. An artificial bait, comprising a body, the exterior surface of which is composed of a number of spiral ribs and intermediate grooves, said ribs and grooves extending the whole length of the body and vanishing at the ends, substantially as described.

4. An artificial bait, comprising a body the exterior surface of which is composed of a number of spiral ribs and intermediate grooves, the alternating surfaces of the grooves being of a different color or shade, substantially as described.

5. An artificial bait, comprising a hollow body adapted to have a rotary motion when drawn through the water, the surface of said body being composed of a number of spiral ribs and corresponding intermediate grooves, the surface of one grove being of a silvery-white color and the next groove of a dark color, and so on, alternating throughout the series and having a vanishing effect when rotated, substantially as described.

6. An artificial bait, comprising a hollow spiral body, adapted to have a rotary motion when drawn through the water, a tube, open at both ends and inserted longitudinally through said body and having its respective ends rigidly fixed in the respective ends of the body, a wire rod extending through said tube and projecting from each end thereof, and means for loosely retaining said rod in position, substantially as described.

7. In an artificial bait, the combination with a hollow spiral body, of an axial tube, fixed therein, a wire rod inserted in and projecting from the respective ends of said tube, the hooks secured to one end of said rod, the swivel secured to the opposite end, and means for loosely retaining said rod in place, substantially as described.

In testimony whereof I affix my signature in presence of two witnesses.

FREDERICK W. HEDGELAND.

Witnesses:
L. M. FREEMAN,
L. B. COUPLAND.